United States Patent
Woo et al.

(10) Patent No.: US 11,821,845 B2
(45) Date of Patent: Nov. 21, 2023

(54) VEHICLE AND METHOD OF MANAGING CLEANLINESS OF INTERIOR OF THE SAME

(71) Applicants: HYUNDAI MOTOR COMPANY, Seoul (KR); KIA MOTORS CORPORATION, Seoul (KR)

(72) Inventors: Seung Hyun Woo, Seoul (KR); Min Jae Park, Seongnam-si (KR); Anastasia Yarygina, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 588 days.

(21) Appl. No.: 17/111,008

(22) Filed: Dec. 3, 2020

(65) Prior Publication Data
US 2022/0011242 A1 Jan. 13, 2022

(30) Foreign Application Priority Data
Jul. 9, 2020 (KR) .................. 10-2020-0084879

(51) Int. Cl.
*G01N 21/94* (2006.01)
*H04W 4/02* (2018.01)
*G07C 5/08* (2006.01)
*G07C 5/00* (2006.01)
*G06V 20/59* (2022.01)
*G06V 20/64* (2022.01)

(52) U.S. Cl.
CPC ............. *G01N 21/94* (2013.01); *G06V 20/59* (2022.01); *G06V 20/64* (2022.01); *G07C 5/008* (2013.01); *G07C 5/0808* (2013.01); *H04W 4/025* (2013.01)

(58) Field of Classification Search
CPC ........ G01N 21/94; G01N 15/06; G01N 21/25; G01N 21/88; G01N 33/0004; G01N 21/314; G01N 21/8851; G01N 2021/8887; G06V 20/59; G06V 20/64; G07C 5/008; G07C 5/0808; H04W 4/025; B60R 16/0232; G06Q 50/30
See application file for complete search history.

(56) References Cited

U.S. PATENT DOCUMENTS

| | | | |
|---|---|---|---|
| 8,098,302 B2* | 1/2012 | Fukuda | H04N 23/811 348/241 |
| 11,017,248 B1* | 5/2021 | Toth | G05D 1/0088 |
| 11,270,570 B2* | 3/2022 | Woo | G06V 20/59 |
| 11,408,833 B2* | 8/2022 | Park | G06V 20/59 |
| 11,748,671 B2* | 9/2023 | Zemek | G06Q 50/30 705/5 |
| 2017/0210353 A1* | 7/2017 | Stauffer | B60N 2/58 |
| 2017/0291539 A1* | 10/2017 | Avery | B60N 2/002 |
| 2018/0307926 A1* | 10/2018 | Tokatyan | G06V 20/59 |
| 2020/0103354 A1* | 4/2020 | Angermayer | G07C 5/006 |

* cited by examiner

*Primary Examiner* — Sizo B Vilakazi
(74) *Attorney, Agent, or Firm* — Morgan, Lewis & Bockius LLP

(57) ABSTRACT

A method of managing cleanliness of an interior of a vehicle includes: detecting indoor contamination using a contamination detector including at least a camera; receiving information on the next user including information on at least one user scheduled to ride in the vehicle; determining at least one harmful substance based on the result of detection of the indoor contamination and the information on the next user; and transmitting information on the determined at least one harmful substance to the external entity.

20 Claims, 10 Drawing Sheets

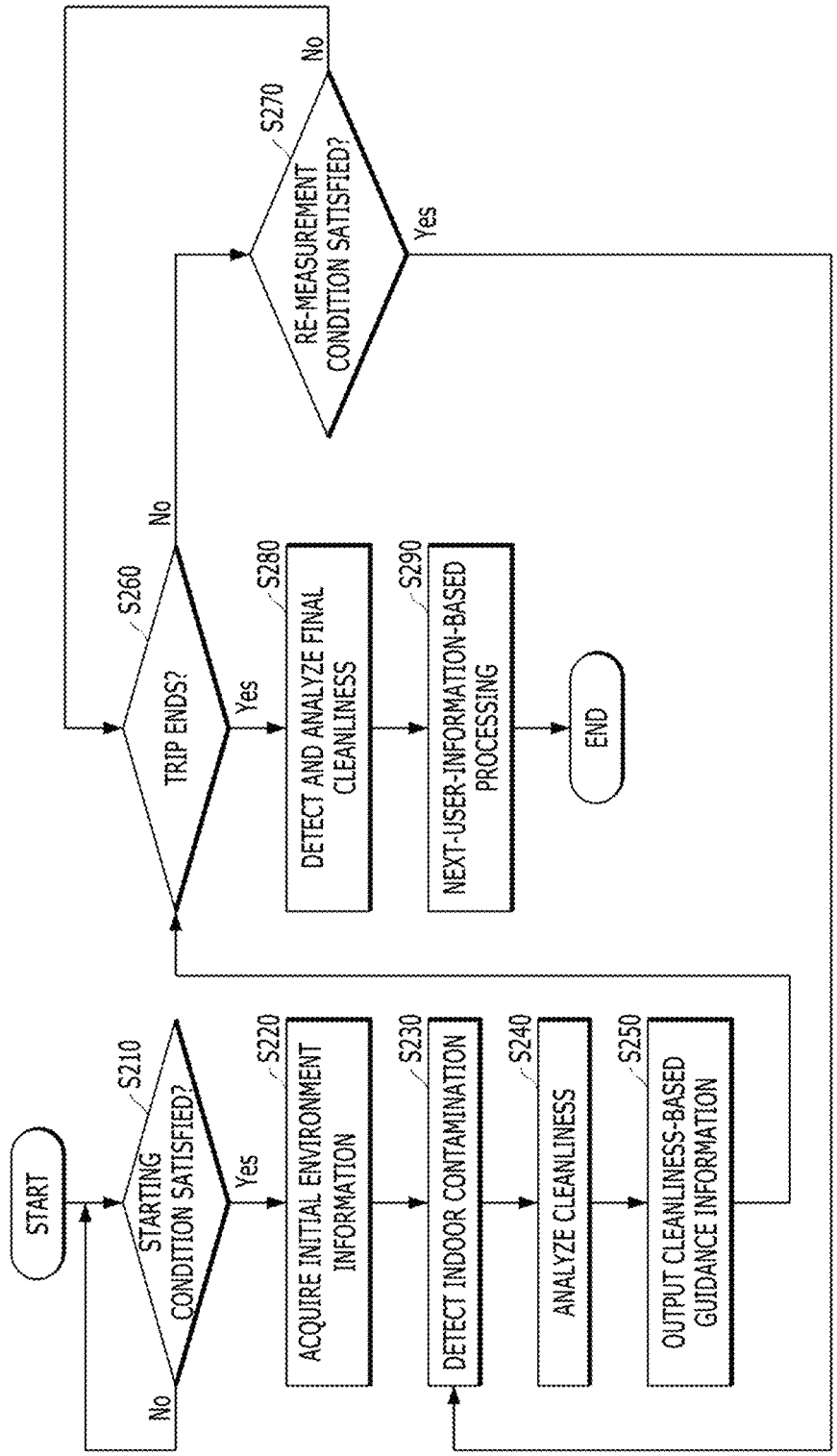

| ICON DISPLAY | | | |
|---|---|---|---|
| TYPE OF CONTAMINANT | SEVERITY OF ODOR | URGENT Y/N | SIZE |
| LIQUID  SOLID | ∫  ∫∫  ∫∫∫ | ⚠ | SIZE OF ICON IS CHANGEABLE DEPENDING ON SIZE OF CONTAMINANT |

810

VEHICLE AND METHOD OF MANAGING CLEANLINESS OF INTERIOR OF THE SAME

CROSS-REFERENCE TO RELATED APPLICATION(S)

This application claims the benefit of Korean Patent Application No. 10-2020-0084879, filed on Jul. 9, 2020 in the Korean Intellectual Property Office, which is hereby incorporated by reference as if fully set forth herein.

TECHNICAL FIELD

The present disclosure relates to a vehicle and a method of managing cleanliness of an interior of the same that are capable of detecting a contaminant present in the interior of the vehicle and taking measures to protect the next user of the vehicle.

BACKGROUND

While a vehicle is traveling, an object present in the interior of the vehicle is subjected to inertial force due to changes in the road surface or acceleration/deceleration of the vehicle. For this reason, in many cases, an object that may cause contamination, such as food, spills and soils a seat or a mat of the vehicle. In the case in which indoor contamination occurs in a privately owned vehicle, the vehicle owner may freely determine whether or not to clean the vehicle. However, in recent years, the concept of vehicle sharing, rather than individual ownership, has expanded due to the advantages of cost savings and utilization efficiency, and thus vehicle sharing and related service markets are expected to maintain high growth. Accordingly, the need to manage the cleanliness of the interior of a vehicle is on the rise.

In a vehicle-sharing service, many people may share one vehicle. Most users have little or no sense of ownership over a shared vehicle, unlike a privately owned vehicle, and thus pay little attention to indoor contamination while using the shared vehicle. Therefore, in many cases, a vehicle is returned with the interior thereof soiled, and is handed over to the next user with the interior thereof in an uncleaned state, which causes dissatisfaction with service quality. Particularly, even though the contaminant in the interior of the vehicle has little influence on the health of the current user, it may be seriously harmful to the health of the next user if the next user is allergic thereto.

The information included in this Background section is only for enhancement of understanding of the general background of the present disclosure and may not be taken as an acknowledgement or any form of suggestion that this information forms the prior art already known to a person skilled in the art.

SUMMARY

The present disclosure is directed to a vehicle and a method of managing the cleanliness of the interior of the same that substantially obviate one or more problems due to limitations and disadvantages of the related art.

An object of the present disclosure is to provide a vehicle and a method of managing the cleanliness of the interior of the same that are capable of more effectively detecting whether the interior of a vehicle has been contaminated and taking measures to protect the next user when detecting a harmful substance.

In addition, another object of the present disclosure is to provide a vehicle and a method of managing the cleanliness of the interior of the same that are capable of, when detecting a harmful substance, providing notification of the presence of the harmful substance and performing control to mitigate the contamination.

However, the objects to be accomplished by the embodiments are not limited to the above-mentioned objects, and other objects not mentioned herein will be clearly understood by those skilled in the art to which the embodiments pertain from the following description.

In order to accomplish the above and other objects, a method of managing cleanliness of an interior of a vehicle according to an embodiment of the present disclosure may include: detecting indoor contamination using a contamination detector including at least a camera; receiving information on the next user including information on at least one user scheduled to ride in the vehicle; determining at least one harmful substance based on the result of detection of the indoor contamination and the information on the next user; and transmitting information on the determined at least one harmful substance to the outside.

In addition, a device for managing the cleanliness of the interior of a vehicle according to an embodiment of the present disclosure may include a contamination detector including at least a camera, a communicator, and a controller configured to detect indoor contamination based on information acquired using the contamination detector, to, when information on the next user including information on at least one user scheduled to ride in a vehicle is received through the communicator, determine at least one harmful substance based on the result of detection of the indoor contamination and the information on the next user, and to perform control such that information on the determined at least one harmful substance is transmitted to the outside through the communicator.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 2 is a flowchart showing an example of a process of managing the cleanliness of the interior of a vehicle according to an embodiment of the present disclosure;

DETAILED DESCRIPTION

Figure 1:
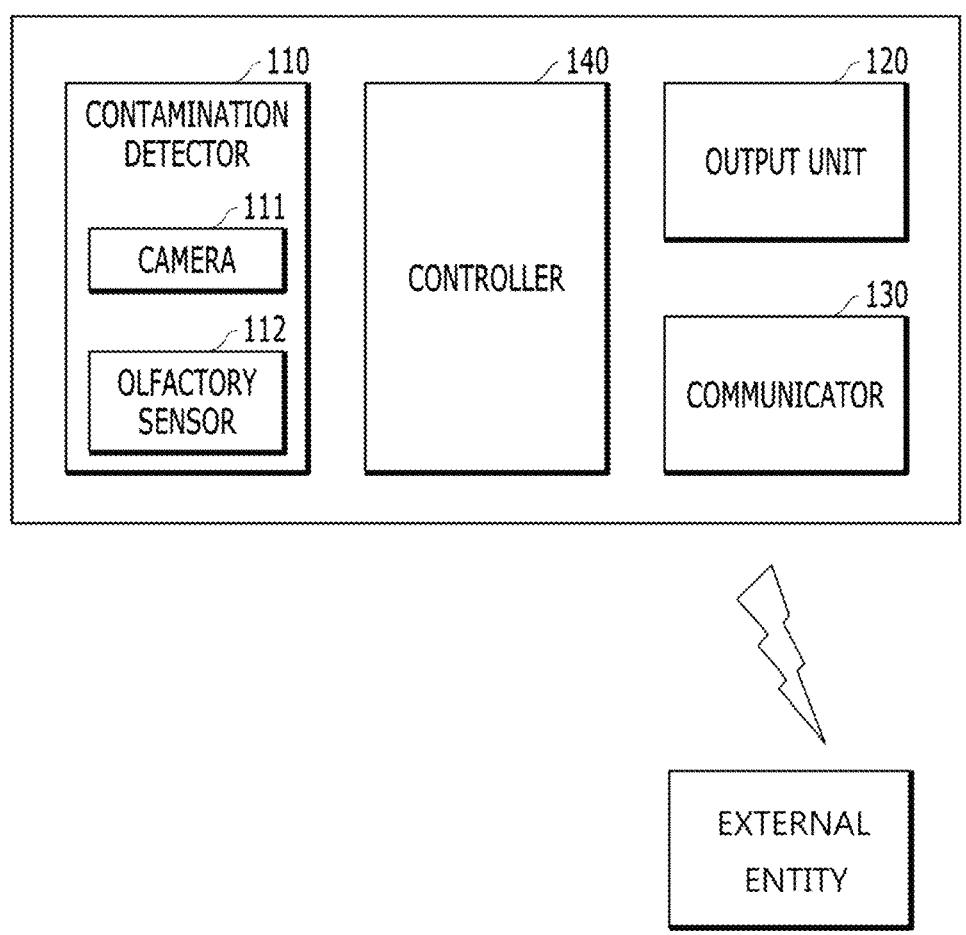
FIG. 1 shows an example of the structure of a device for managing cleanliness of an interior of a vehicle to which embodiments of the present disclosure are applicable.

Hereinafter, embodiments of the present disclosure will be described in detail with reference to the accompanying drawings so that those skilled in the art may easily carry out the embodiments. The present disclosure may, however, be embodied in many different forms, and should not be construed as being limited to the embodiments set forth herein. In the drawings, parts irrelevant to the description of the present disclosure will be omitted for clarity. Like reference numerals refer to like elements throughout the specification.

Throughout the specification, when a certain part "includes" or "comprises" a certain component, this indicates that other components are not excluded, and may be further included unless otherwise noted. The same reference numerals used throughout the specification refer to the same constituent elements.

An embodiment of the present disclosure proposes technology for detecting and analyzing the cleanliness of the interior of a vehicle in various manners and outputting guidance information based thereon. In particular, an embodiment of the present disclosure proposes technology for detecting a harmful substance through analysis of the indoor cleanliness in the situation in which it is possible to acquire information on the next user of a shared vehicle and for taking measures in consideration of the influence of the detected harmful substance on the next user.

FIG. 1 shows an example of the structure of a device for managing the cleanliness of the interior of a vehicle to which embodiments of the present disclosure are applicable.

Referring to FIG. 1, a device for managing the cleanliness of the interior of a vehicle to which embodiments of the present disclosure are applicable may include a contamination detector 110, which detects whether the interior of the vehicle has been contaminated, an output unit 120, which outputs guidance information, a communicator 130, which performs communication with an internal device and an external device of the vehicle so as to exchange data therewith, and a controller 140, which performs overall control of the aforementioned components.

The contamination detector 110 may include a camera 111 for acquiring an image of the interior of the vehicle in order to detect contamination based on image information and an olfactory sensor 112 for detecting contamination through odor. The camera 111 may include a plurality of cameras depending on the area of the interior that is subjected to contamination detection and on the contamination detection method. For example, the cameras may be disposed at a region near the rear-view mirror in order to photograph the front seats and the surroundings thereof (e.g. the driver's seat, the front passenger seat, the dashboard, etc.) and at the center or the rear end portion of the roof in order to photograph the rear seats and the surroundings thereof (e.g. the rear passenger seats, the lower end region of the rear glass, etc.), without being limited thereto. The position and number of cameras are not limited, so long as it is possible to effectively photograph the indoor region that is being subjected to contamination detection. Similarly, the position and number of olfactory sensors 112 are not limited.

At least one of a general RGB-type camera, an infrared (IR) camera, a stereo camera for capturing a three-dimensional (3D) image, or a camera equipped with a spectroscopic sensor may be used as the camera 111 in order to detect an object and contamination, which will be described later.

Although not illustrated in FIG. 1, the contamination detector 110 may further include a dust sensor for analyzing the particle concentration of dust or fine dust in the indoor air.

The output unit 120 may output guidance information in various forms. For example, the output unit 120 may include a display to output guidance information in the form of visual information, or may include a speaker to output guidance information in the form of acoustic information. The display may include a display of a head unit or a display disposed in a cluster. However, the display is not limited to any specific form, so long as it is capable of visually outputting guidance information.

The communicator 130 may include at least one of a wired communicator (not shown), through which the vehicle cleanliness management device communicates with other entities (e.g. control units) mounted in the vehicle, and a wireless communicator (not shown), through which the vehicle cleanliness management device communicates with entities (e.g. an external server, a smart device carried by an occupant, etc.) other than the corresponding vehicle. The wired communicator may support one or more protocols that are applicable to predetermined vehicle network communication, such as CAN, CAN-FD, LIN, and Ethernet, without being limited thereto. The wireless communicator may support at least one of short-range communication (e.g. Bluetooth, Wi-Fi, Wi-Di, ZigBee, NFC, etc.) for communication with a smart device carried by an occupant, telematics, or cellular-based communication (e.g. 3G, LTE, 5G, etc.).

Upon detecting preparation or commencement of movement of the vehicle through the communicator 130, the controller 140 may obtain information for determination of the indoor cleanliness from the contamination detector 110 to analyze the indoor cleanliness, and may output guidance information corresponding to the analysis result through the output unit 120. In addition, the controller 140 may transmit information corresponding to the analysis result to an external entity, such as a vehicle-sharing service server, a telematics server, or a terminal carried by an occupant, through the communicator 130.

Hereinafter, a process of managing the cleanliness of the interior of a vehicle will be described in detail on the basis of the configuration of the vehicle cleanliness management device described above.

FIG. 2 is a flowchart showing an example of a process of managing the cleanliness of the interior of a vehicle according to an embodiment of the present disclosure.

Referring to FIG. 2, the controller 140 may determine whether a starting condition is satisfied (S210). For example, the starting condition may be satisfied when notification is received from a vehicle-sharing service server that the vehicle is assigned to the next user, when the door of the vehicle is unlocked after the end of the previous trip, or when the vehicle is started, without being limited thereto.

When the starting condition is satisfied (Yes in S210), initial environment information may be acquired (S220). Here, the initial environment information may be information on the state of the interior of the vehicle before the user starts to use the vehicle. For example, the initial environment information may be information on the state of the interior of the vehicle when the vehicle is shipped, information on the state before the current user starts to drive the vehicle after the end of the last use thereof, or information on the state before contamination occurs after the current user gets in the vehicle. Thus, this step may be performed in the manner of acquiring an image for determination of the vehicle interior material, the location of basic in-vehicle items, and the color of the seats and mats through the camera 111 and detecting the odor of the interior before contamination through the olfactory sensor 112. In another embodiment, this step may be performed in the manner of acquiring default initial environment information from a vehicle-sharing service server. In still another embodiment, this step may be omitted.

Subsequently, indoor contamination detection may be performed through the contamination detector 110 in order to determine the cleanliness of the interior of the vehicle (S230), and the controller 140 may analyze the cleanliness based on the detection information (S240). A detailed description of the detection process S230 will be made later with reference to FIGS. 3A, 3B, 4A, 4B, 5A, 5B, 5C, 6A, and 6B. The cleanliness may be analyzed in the following manner.

The cleanliness may be analyzed on the basis of the classification and location of contamination.

TABLE 1

| Type of Contaminant | Size of Contaminated Region | Difference between Color of Contaminated Region and Original Color | Material Property | Severity of Odor |
|---|---|---|---|---|
| Liquid | 30 cm or Greater | Large Difference | High Viscosity | High |
| Solid | 5 to 30 cm | Intermediate Difference | Low Viscosity | Intermediate |
|  | Less than 5 cm | Small Difference | No Viscosity (Dry) | No Odor |

As can be seen from Table 1, the contamination may be classified on the basis of the type of contaminant, the size of the contaminated region, the difference between the color of the contaminated region and the original color, the material property (viscosity), and the severity of odor. The cleanliness may be given different scores (or weights) depending on the classification of each item. For example, if the size of the contaminated region is 30 cm or greater, the color difference is large, and the severity of odor is high, the cleanliness may be determined to be very low, and if the size of the contaminated region is less than 5 cm, the color difference is small, and there is no odor, the cleanliness may be determined to be very high.

TABLE 2

| Material of Contaminated Region | Elapsed Time since Contamination Discovery |
|---|---|
| Leather | 60 Minutes or more |
| Fabric | 30 to 60 Minutes |

TABLE 2-continued

| Material of Contaminated Region | Elapsed Time since Contamination Discovery |
|---|---|
| Plastic | 10 to 30 Minutes |
| Metal | Within 10 Minutes |

As can be seen from Table 2, the cleanliness may be weighted differently depending on the material of the contaminated region and the contamination time period for each material. For example, in the case of metal, which is relatively resistant to contamination, the cleanliness may not be greatly lowered even when a large amount of time passes after contamination. However, in the case of fabric, which is susceptible to contamination, the cleanliness may be weighted strongly so as to be greatly lowered even when a small amount of time passes after contamination.

In summary, the controller 140 may give a cleanliness score to each item shown in Tables 1 and 2 such that the cleanliness score gradually increases from the uppermost criterion of each item to the lowermost criterion thereof, and may determine the cleanliness by summing the scores given to the respective items. However, this is merely illustrative, and it will be apparent to those skilled in the art that the items/criteria shown in Tables 1 and 2 and the weights given thereto may be variously set.

Upon determining that the interior of the vehicle is contaminated based on the cleanliness analysis result, the controller 140 may output guidance information about the indoor contamination through the output unit 120 (S250). A concrete form in which the guidance information is output will be described later with reference to FIGS. 7, 8A, 8B and 9.

The controller 140 may determine whether a re-measurement condition is satisfied (S270) until the end of the trip (No in S260), and may repeatedly detect and analyze the indoor cleanliness when the re-measurement condition is satisfied (Yes in S270). Here, the re-measurement condition may be satisfied when a predetermined amount of time has passed since the last cleanliness analysis, when cleanliness-based guidance indicating that immediate cleaning is required is output, when the contamination level continues to increase at every re-measurement, when at least one of the objects that had been detected previously has disappeared, or when there is a change in occupants through opening of the door, without being limited thereto. For example, among the re-measurement conditions, in the case in which at least one of the objects (including the occupants) that had been detected previously has disappeared, the cleanliness of the region that was hidden or covered by the object that has disappeared may be re-measured.

When the trip ends (Yes in S260), the controller 140 may detect and analyze the final cleanliness using the contamination detector 110 (S280), and may perform harmful substance processing based on the analysis result and information on the next user (S290). The process of detecting and analyzing the final cleanliness corresponds to steps S230 and S240, and thus a duplicate description thereof will be omitted. The harmful substance processing will be described later in greater detail with reference to FIG. 3B.

Hereinafter, the cleanliness detection process will be described in greater detail with reference to FIGS. 3A, 3B, 4A, 4B, 5A, 5B, 5C, 6A, and 6B.

Figure 3A:
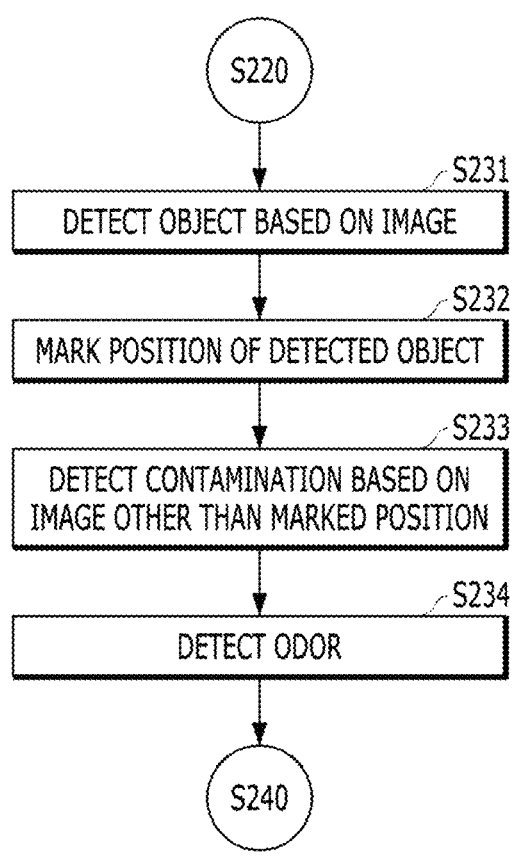
FIG. 3A is a flowchart showing an example of the manner in which the indoor cleanliness detection process of FIG. 2 is performed.

FIG. 3A is a flowchart showing an example of the manner in which the indoor cleanliness detection process of FIG. 2 is performed.

Referring to FIG. 3A, in order to detect the indoor cleanliness, detection and analysis of an object may be performed based on an image captured by the camera 111 (S231). The object detection may be a process of detecting an object that was not present in the initial state through object detection logic in an image captured by an RGB camera or a stereo camera. In this case, the controller 140 may directly perform the object detection using preset artificial intelligence (AI) logic, or may transmit an image acquired through the camera 111 to an external server through the communicator 130 and may receive an object detection result from the external server. In addition, in order to detect an object that was not present in the initial state, the controller 140 may compare the currently acquired image with the initial environment information. In addition, in this process, the type of the object (e.g. a person, a pet, clothing, food, a container, etc.) may be analyzed through image recognition.

Since the present disclosure is not limited to any specific object detection and analysis logic, a concrete description of the algorithm of the object detection and analysis logic will be omitted.

When at least one object is detected to be present in the interior of the vehicle through the object detection and analysis process S231, the controller 140 may mark (i.e. record) the position at which the corresponding object is detected (S232).

In addition, the controller 140 may detect whether the interior of the vehicle has been contaminated based on an image captured by the camera 111 (S233). In this case, the indoor region that is being subjected to contamination detection may be a region other than the region in which an object is detected. The reason for this is to prevent the object itself from being mistaken as contamination. In addition, whether or not the object itself is a harmful substance may be determined by combining the above-described analysis process and a detection device other than the camera 111.

As a contamination detection method, a method of determining whether the inherent color of molecules of indoor components differs from the initial environment information using a spectroscopic sensor may be applied. For example, if both the wavelength corresponding to the inherent color of a leather seat and the wavelength corresponding to another color are detected, it may be determined that the leather seat has been contaminated. In addition, if the reflectivity of a certain part in an image captured by an RGB camera or an IR camera increases, it may be determined that the part has been contaminated by liquid. Apart from the above contamination detection methods, any other contamination detection method may be applied, so long as it is possible to determine contamination through image analysis or optical analysis.

In addition, in order to detect the indoor cleanliness, odor detection may be performed using the olfactory sensor 112 (S234). Although the odor detection process is illustrated in FIG. 3A as being performed in the final stage, it may be performed prior to the image-based detection process, or may be performed simultaneously therewith. In the situation in which contamination is not detected based on optical detection (using the camera 111) in a region other than the region in which an object is detected, if an odor corresponding to contamination is detected, the odor may be determined to be caused by the object.

Hereinafter, the next-user-information-based processing will be described with reference to FIG. 3B.

Figure 3B:
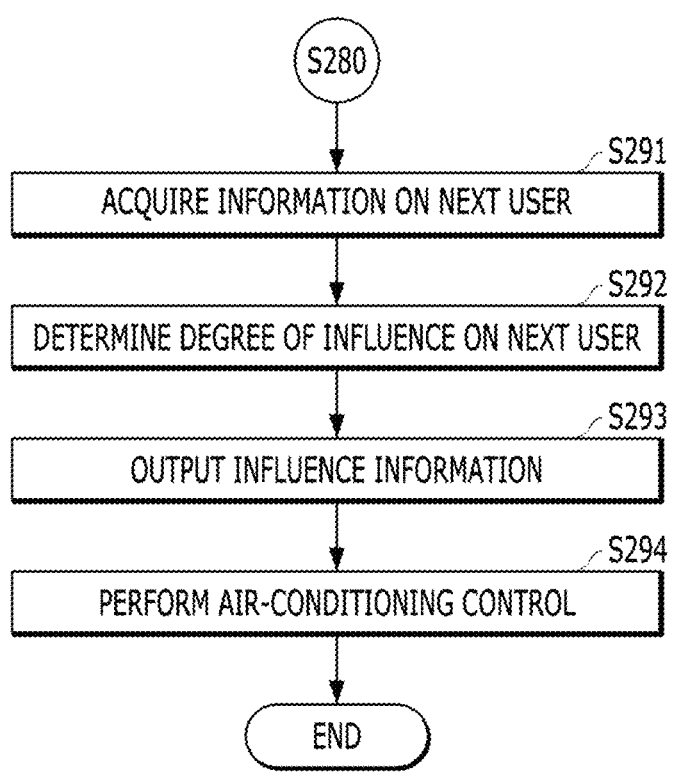
FIG. 3B shows an example of the manner in which next-user-information-based processing of FIG. 2 is performed.

FIG. 3B shows an example of the manner in which the next-user-information-based processing of FIG. 2 is performed.

Prior to describing FIG. 3B, the harmful substance mentioned herein is defined.

The term "harmful substance" mentioned herein conceptually includes a substance causing an allergy and a substance causing an unpleasant feeling or infection. An allergy-causing substance may include hair such as animal hair, highly concentrated dust, and specific food (eggs, dairy products, nuts, fish, shellfish, etc.). In addition, a substance causing an unpleasant feeling or infection may include human or animal excreta, vomit, and blood. However, the aforementioned harmful substances are merely illustrative. Not only a substance that is generally regarded as being harmful to the human body but also a substance that is designated in advance as a harmful substance by individual occupants may correspond to the harmful substance defined in the embodiment.

Referring to FIG. 3B, information on the next user may be acquired through the communicator 130. The information on the next user may be received from a terminal carried by the next user or from a vehicle-sharing service server, without being limited thereto. In addition, the information on the next user may include information for determining a specific harmful substance for each of at least one occupant who is scheduled to ride in the corresponding vehicle.

Here, the specific harmful substance may not be a general harmful substance, such as blood, which poses the risk of infection to anyone, but may be a substance that has different harmful influences on or gives different unpleasant feelings to occupants depending on their age or physical constitution.

Information for determining a specific harmful substance may include an age, occupation, gender, allergy-causing substances directly stated by the occupant, and distasteful substances directly stated by the occupant. However, this is merely illustrative. The information for determining a specific harmful substance is not limited to any specific type of information, so long as it is capable of being used to determine whether a certain substance is a specific harmful substance.

For example, as can be seen from Table 3 below, foods to which occupants are mainly allergic differ depending on the age of the occupants.

TABLE 3

| Harmful Substance | Age |
| --- | --- |
| Egg White | 24 Months Old or Above |
| Milk | 12 Months Old or Above |
| Nuts | 24 Months Old or Above |
| Sesame | 1 to 7 Years Old |
| Fish | 36 Months Old or Above |
| Shellfish | 13 Years Old or Above |
| Wheat | 24 Months Old or Above |
| ... | ... |

When an occupant is 10 years old, sesame and shellfish, among the substances in Table 3, may not be regarded as harmful substances unless otherwise stated by the occupant. When an occupant is younger than 12 months of age, all of the substances in Table 3 may be excluded from harmful substances. Although classified by age in Table 3, the allergy-causing substances may be classified by allergy intensity.

As another example, when the occupation of an occupant is a cook, foods may not be regarded as harmful substances unless otherwise stated by the occupant.

Upon acquiring the information on the next user, the controller 140 may determine the degree of influence on the next user using the final result of detection and analysis of cleanliness (S292).

In order to determine the degree of influence, the controller 140 may determine a harmful substance for the next user based on the analysis result and the information on the next user. For example, the controller 140 may compare the contaminant included in the analysis result with a preset general harmful substance list to determine whether the contaminant is a general harmful substance. In addition, the controller 140 may determine candidate harmful substances based on items, such as the age, gender, and occupation of each occupant who is scheduled to ride in the vehicle, which are included in the information on the next user, and may compare the candidate harmful substances with the contaminant included in the analysis result to determine whether the contaminant is a specific harmful substance. In this case, in the process of determining the candidate harmful substances, the harmful substances directly stated by the occupant may be immediately classified as candidate harmful substances, and the harmful substance list defined on the basis of items such as the age, gender, and occupation may be referred to. However, the present disclosure is not limited thereto.

Upon determining that a harmful substance is present in the interior of the vehicle, the controller 140 may determine the degree of influence of the harmful substance on each occupant. Similar to the description made above with reference to Tables 1 to 3, the degree of influence of the harmful substance may be weighted differently depending on the size of the contaminant, the elapsed time since contamination, and the type of the contaminant, and may also be weighted differently for each occupant. In addition, in the case in which the position at which an occupant is to be located is included in the information on the next user, a harmful substance that is located near the position at which the corresponding occupant is to be located may be more greatly weighted for the corresponding occupant than other harmful substances.

For example, when dog hair is detected in the front passenger seat and two users who are allergic to dog hair are scheduled to respectively sit in the front passenger seat and the rear passenger seat, the dog hair in the front passenger seat may have a greater influence on the user sitting in the front passenger seat than on the user sitting in the rear passenger seat. In addition, in the case of an allergy-causing substance, the allergy intensity may be further considered in the determination of the degree of influence of a harmful substance.

Upon completely determining the degree of influence, the controller 140 may output the influence information in a predetermined manner (S293). The influence information may be transmitted to the outside through the communicator 130, or may be output through the output unit 120 when the next user gets in the vehicle.

In the case of transmission to the outside, the entity that receives the influence information may be at least one of a vehicle-sharing service server, a preset cleaning company server, a telematics center, or a smart device of the previous/next occupant. When the vehicle-sharing service server receives the influence information, it may assign benefits or a penalty to the most recent occupant based on the cleanliness level (penalty, particularly to the occupant who caused the problem related to the harmful substance). This assignment of benefits or a penalty may be applied to a user reputation system rather than to the user only once.

When the cleaning company server receives the influence information, it may determine whether to dispatch cleaning personnel. In addition, the influence information may be transmitted to a smart device carried by the previous occupant in order to warn of the possibility of imposing a penalty, thereby inducing the previous occupant to return to the vehicle and remove the harmful substance. In addition, the information transmitted to a smart device carried by the previous occupant may indicate that an object that is not a harmful substance (i.e. a lost article) was left behind in the vehicle so that the previous occupant may pick up the same immediately.

In addition, the degree of influence on the next user may be output in the form of an influence score for each of at least one occupant, the form of a substance list sorted by the degree of influence on each occupant in descending order, or a form including the degree of influence of each harmful substance on each occupant. However, this is merely illustrative, and the present disclosure is not limited thereto.

In addition, the controller 140 may perform air-conditioning control in consideration of the degree of influence until the next user gets in the vehicle (S294). Here, the air-conditioning control may conceptually include not only operation of a fan in an external air circulation mode but also ventilation through opening of windows and a sunroof. In addition, when performing the air-conditioning control, the controller 140 may selectively control the direction and speed of wind depending on the position of a harmful substance so as to promote the discharge of the harmful substance to the outside.

Figure 4A:
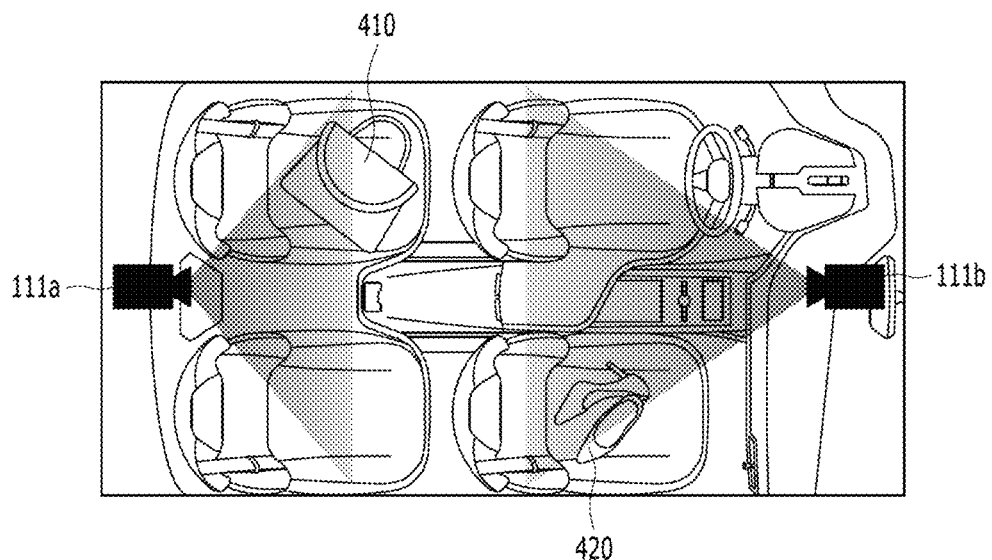
FIGS. 4A and 4B show an example of the manner in which image-based object detection is performed according to an embodiment of the present disclosure.
Figure 4B:
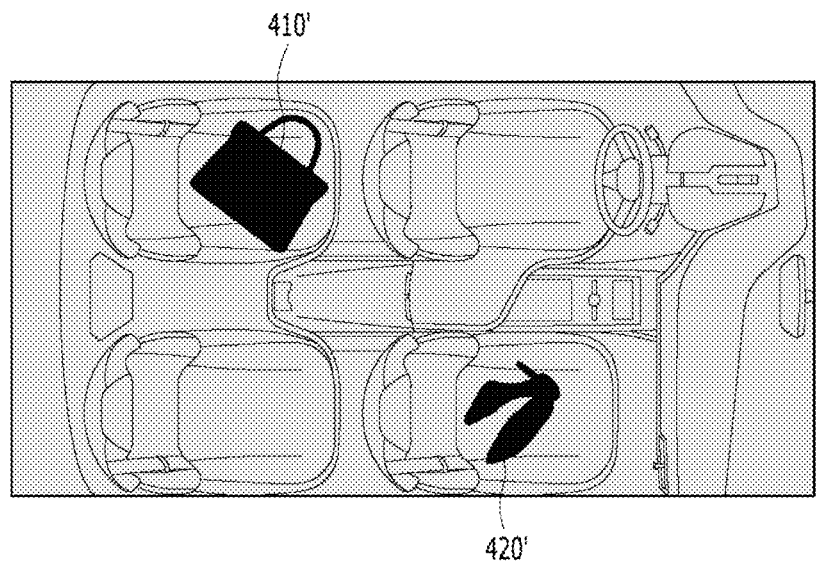

FIGS. 4A and 4B show an example of the manner in which image-based object detection is performed according to an embodiment of the present disclosure.

In FIGS. 4A and 4B and the drawings below, it is assumed that the camera 111 mounted in the interior of the vehicle includes a camera 111a disposed at a region near the rear seats in order to photograph the rear seats and the surroundings thereof and a camera 111b disposed at a region near the front seats in order to photograph the front seats and the surroundings thereof.

Referring to FIG. 4A, an object 410 present on the rear seat behind the driver's seat and an object 420 present on the front passenger seat may be detected through the image-based detection process. The controller 140, as shown in FIG. 4B, may mark positions 410' and 420' at which the objects 410 and 420 are respectively detected so that the positions 410' and 420' are excluded from the region that is subjected to contamination detection when the image-based contamination detection process is performed.

Figure 5A:
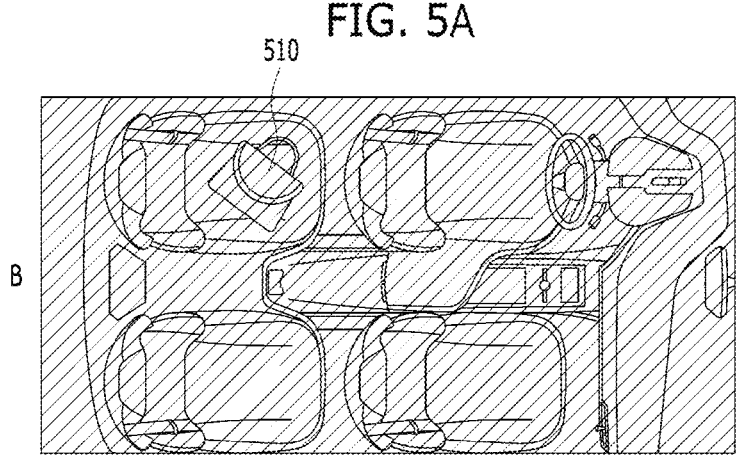
FIGS. 5A, 5B, and 5C show an example of the manner in which image-based contamination detection is performed according to an embodiment of the present disclosure.
Figure 5B:
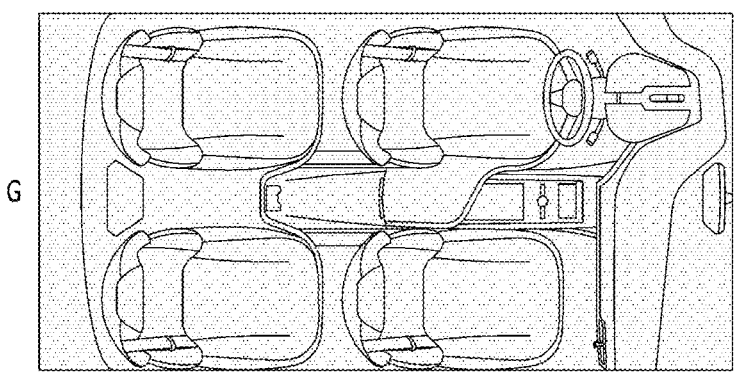
Figure 5C:
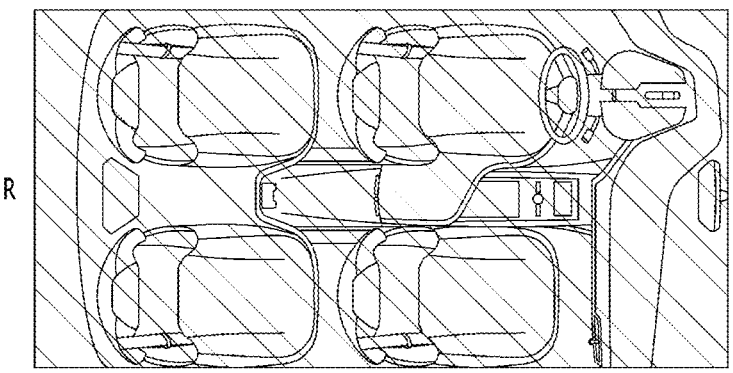

FIGS. 5A, 5B, and 5C show an example of the manner in which image-based contamination detection is performed according to an embodiment of the present disclosure.

FIGS. 5A, 5B, and 5C show an example of an image captured in order to apply a spectroscopy technique to each RGB color region. Here, if there is a region 510 in which a wavelength different from that of the initial environment information is detected, the region 510 may be recognized as a contaminated region. Similar to the detection process of FIGS. 4A and 4B, if an object 410 is detected on the rear seat behind the driver's seat, the region 510 is excluded from the region that is subjected to contamination detection, and thus the difference between the wavelength detected in the region 510 and the initial environment information may be ignored.

Figure 6A:
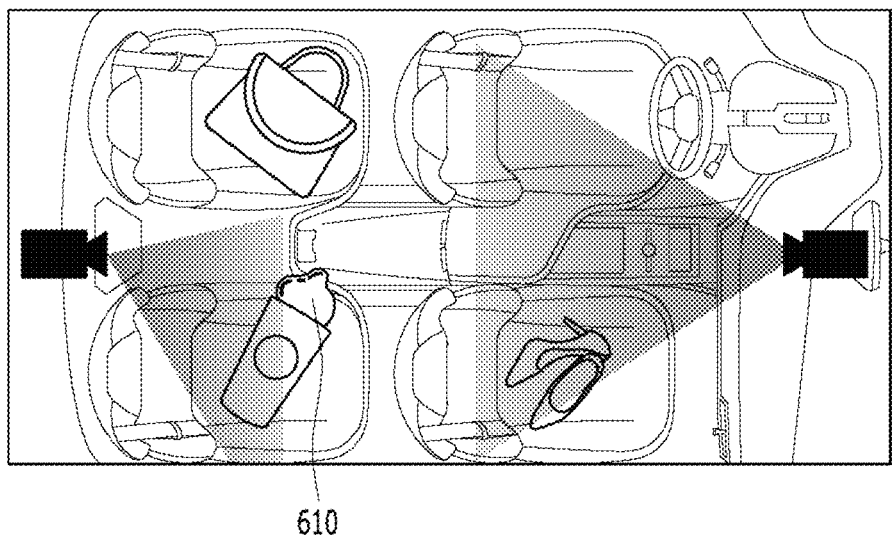
FIGS. 6A and 6B show an example of the manner in which image-based contamination tracking is performed according to an embodiment of the present disclosure.
Figure 6B:
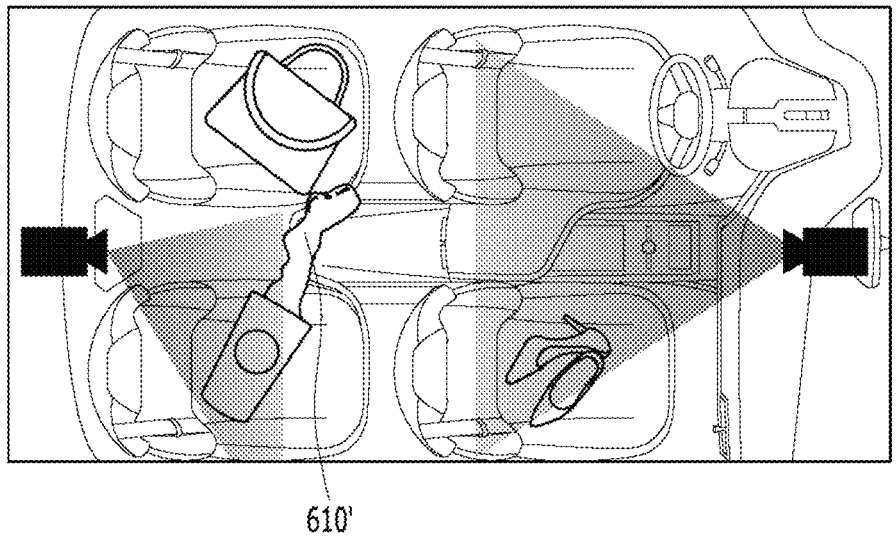

FIGS. 6A and 6B show an example of the manner in which image-based contamination tracking is performed according to an embodiment of the present disclosure.

Referring to FIG. 6A, a contaminated region 610 may be detected in the cleanliness detection process. Thereafter, when the re-measurement condition is satisfied (Yes in S270) and the indoor cleanliness is detected again, if it is detected that the contamination of the region 610 has expanded, as indicated by reference numeral 610' in FIG. 6B, the controller 140 may determine that the contamination level has increased.

Hereinafter, a form in which the guidance information is output will be described with reference to FIGS. 7, 8A, 8B, and 9.

Figure 7:
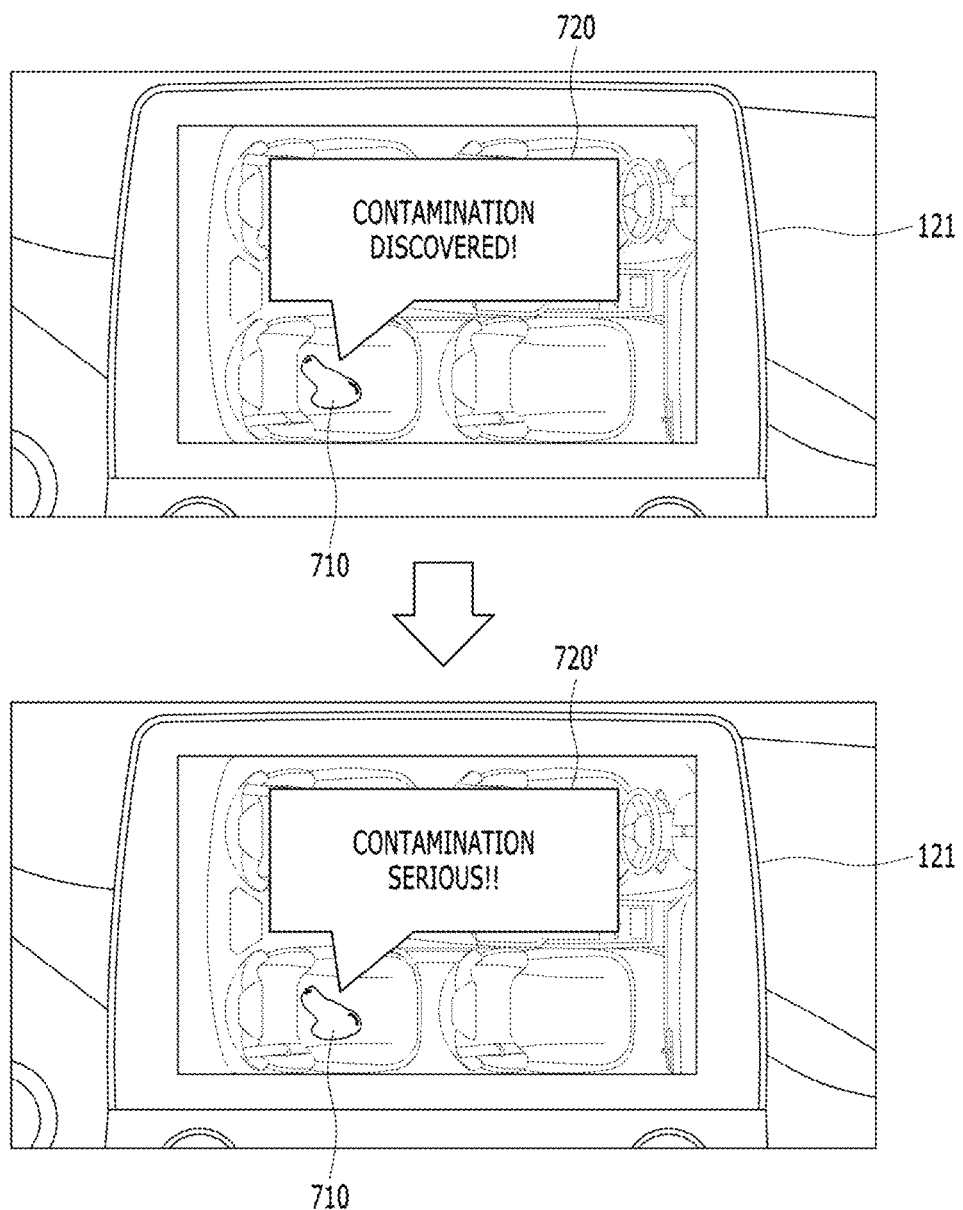
FIG. 7 shows an example of the form in which cleanliness-based guidance information is output according to an embodiment of the present disclosure.

FIG. 7 shows an example of the form in which cleanliness-based guidance information is output according to an embodiment of the present disclosure.

Referring to the upper drawing in FIG. 7, when the controller 140 determines that the indoor cleanliness level determined thereby is equal to or less than a predetermined level, the controller 140 may output guidance information corresponding to the determination through a display 121 of the head unit. Here, the guidance information may include at least one of a display object 710 or text 720, which indicates a contaminated region and the degree of contamination.

When the determined cleanliness is very low or when the size of the contaminated region is increasing as shown in FIGS. 6A and 6B, the controller 140 may change the form of at least some of the guidance information. For example, as shown in the lower drawing in FIG. 7, the content and the color of the text 720' may be changed, but this is merely illustrative. Various types of visual effects may be provided depending on the cleanliness or a change in the size of the contaminated region.

The above-described guidance information may disappear when a predetermined amount of time passes after the output thereof or when it is determined at the next detection and analysis of cleanliness that the cleanliness has increased above a predetermined level. However, the present disclosure is not limited thereto.

As shown in FIG. 7, in the case in which the guidance information includes an icon-type display object 710, which indicates the occurrence of contamination, the icon may be changed so as to indicate the state of contamination. This will be described below with reference to FIGS. 8A and 8B.

Figures 8A, 8B:
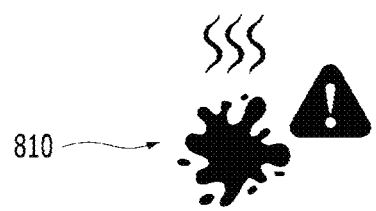
FIGS. 8A and 8B show an example of contamination guidance information according to an embodiment of the present disclosure.

FIGS. 8A and 8B show an example of the contamination guidance information according to an embodiment of the present disclosure.

Referring to FIG. 8A, the shape of a main icon may be determined depending on the type of contaminant, and a first auxiliary icon indicating the severity of odor and a second auxiliary icon indicating the severity of contamination (e.g. the situation in which a contaminated region is expanding or in which the cleanliness is very low) may be displayed near the main icon. In addition, the size of the main icon may be changed depending on the size of the contaminated region. In addition, the color of the main icon may be changed depending on the cleanliness. For example, a blue main icon may indicate high cleanliness, a yellow main icon may indicate intermediate cleanliness, and a red main icon may indicate low cleanliness. However, this is merely illustrative, and the present disclosure is not limited thereto.

Accordingly, in the case in which a region contaminated by liquid having an intermediate contamination level and a strong odor is expanding, the icon 810 may have the shape shown in FIG. 8B.

In addition, the guidance information may further include a contaminated region. This will be described below with reference to FIG. 9.

Figure 9:
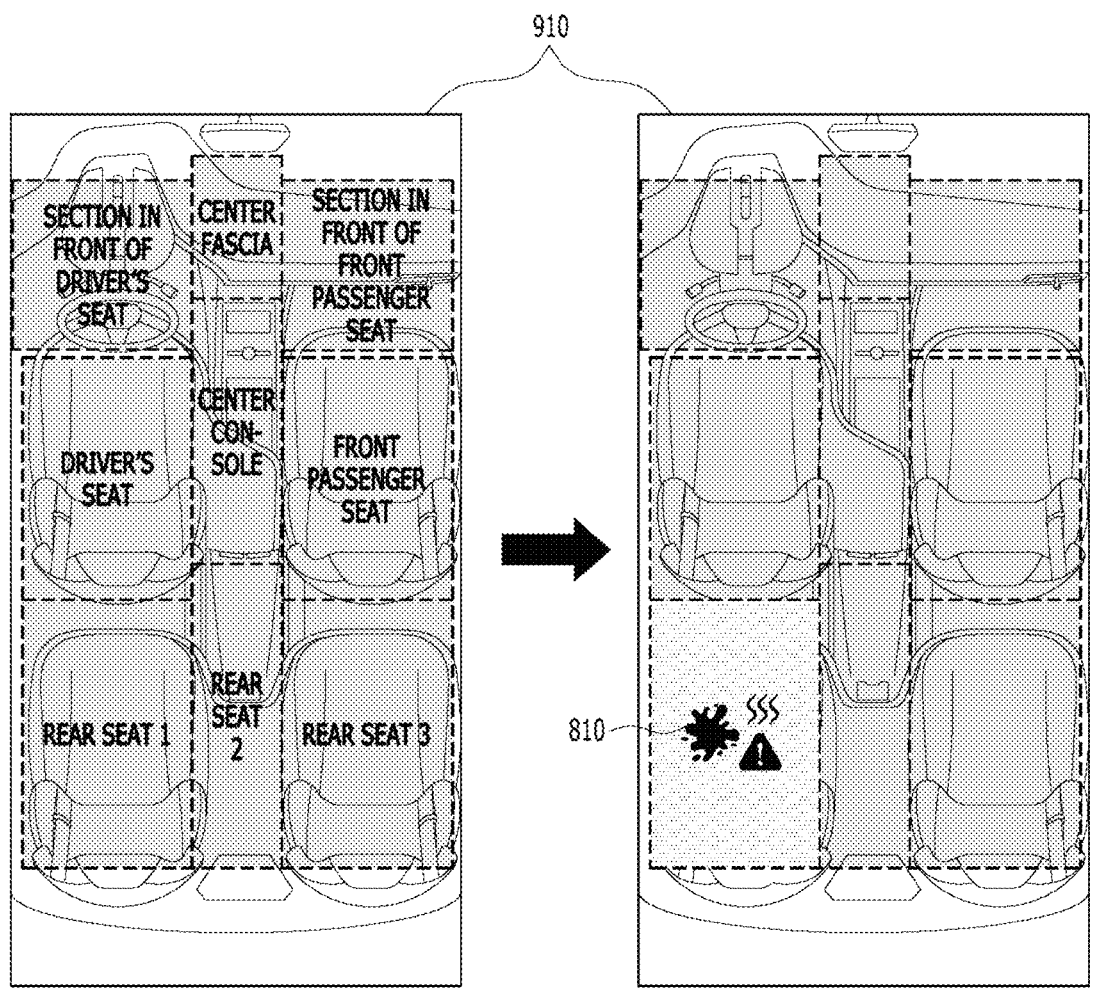
FIG. 9 shows an example of cleanliness-based guidance information for each section according to an embodiment of the present disclosure.

FIG. 9 shows an example of cleanliness-based guidance information for each section according to an embodiment of the present disclosure.

Referring to the left drawing in FIG. 9, the indoor region 910 of the vehicle included in the guidance information may be divided into nine sections, namely, the section in front of the driver's seat (e.g. the steering wheel, the dashboard in front of the driver's seat, the region around the pedal, etc.), the center fascia, the section in front of the front passenger seat (e.g. the glove compartment, the dashboard in front of the front passenger seat, the mat in front of the front passenger seat, etc.), the driver's seat, the center console, the front passenger seat, the rear seat 1, the rear seat 2, and the rear seat 3. As shown in the right drawing in FIG. 9, the controller 140 may display the icon 810, described above with reference to FIGS. 8A and 8B, in the section in which contamination is detected so that the occupant may intuitively recognize which section is contaminated. In addition to the icon 810, a predetermined visual effect (e.g. warning coloration) may be further applied to the section in which contamination is detected.

Although the guidance information has been described with reference to FIGS. 7, 8A, 8B, and 9 as being output based on the cleanliness level (refer to step S250 in FIG. 2), guidance information on a harmful substance may also be provided in a manner similar to the manner in which guidance information on general contamination is provided.

The present disclosure may be implemented as code that can be written on a computer-readable recording medium and thus read by a computer system. The computer-readable recording medium includes all kinds of recording devices in which data that may be read by a computer system are stored. Examples of the computer-readable recording medium include a Hard Disk Drive (HDD), a Solid-State Disk (SSD), a Silicon Disk Drive (SDD), a Read-Only Memory (ROM), a Random Access Memory (RAM), a Compact Disk ROM (CD-ROM), a magnetic tape, a floppy disc, and an optical data storage.

As is apparent from the above description, a vehicle according to at least one embodiment of the present disclosure configured as described above is capable of determining an indoor contaminated region in various manners and detecting a harmful substance.

In addition, when a harmful substance is detected, it is possible to determine the degree of influence of the harmful substance on the next user, to notify the next user of the degree of influence, and to perform air-conditioning control, thereby protecting the health of the next user.

However, the effects achievable through the disclosure are not limited to the above-mentioned effects, and other effects not mentioned herein will be clearly understood by those skilled in the art from the above description.

It will be apparent to those skilled in the art that various changes in form and details may be made without departing from the spirit and essential characteristics of the disclosure set forth herein. Accordingly, the above detailed description is not intended to be construed to limit the disclosure in all aspects and to be considered by way of example. The scope of the disclosure should be determined by reasonable interpretation of the appended claims and all equivalent modifications made without departing from the disclosure should be included in the following claims.

What is claimed is:

1. A method of managing cleanliness of an interior of a vehicle, the method comprising:
   detecting indoor contamination using a contamination detector comprising at least a camera;
   receiving information on a next user comprising information on at least one user scheduled to ride in the vehicle;
   determining at least one harmful substance based on a result of detection of the indoor contamination and the information on the next user; and transmitting information on the at least one harmful substance to an external entity.

2. The method according to claim 1, wherein the determining at least one harmful substance comprises comparing at least one substance included in the result of detection of the indoor contamination with a predetermined harmful substance list.

3. The method according to claim 1, wherein the information on the next user comprises information used to determine a specific harmful substance for each of the at least one user.

4. The method according to claim 3, wherein the information used to determine the specific harmful substance comprises at least one of age, occupation, gender, allergy-causing substances, or distasteful substances.

5. The method according to claim 3, wherein the determining at least one harmful substance comprises:
determining a candidate harmful substance based on the information used to determine the specific harmful substance; and
comparing the candidate harmful substance with at least one substance included in the result of detection of the indoor contamination.

6. The method according to claim 1, further comprising determining a degree of influence of each of the determined at least one harmful substance on each of the at least one user.

7. The method according to claim 6, wherein the information on the next user comprises a position at which each of the at least one user is scheduled to be located, and
wherein the determining a degree of influence is performed in consideration of the position at which each of the at least one user is scheduled to be located and a position of the at least one harmful substance.

8. The method according to claim 1, further comprising performing air-conditioning control in consideration of a position of the determined at least one harmful substance.

9. The method according to claim 1, wherein the detecting indoor contamination comprises:
detecting at least one object in an indoor region subjected to contamination detection; and
detecting whether contamination has occurred in the indoor region excluding a region in which each of the at least one object is detected.

10. A non-transitory computer-readable recoding medium containing a program configured to perform a method of managing cleanliness of an interior of a vehicle, wherein the method comprises:
detecting indoor contamination using a contamination detector comprising at least a camera;
receiving information on a next user comprising information on at least one user scheduled to ride in the vehicle;
determining at least one harmful substance based on a result of detection of the indoor contamination and the information on the next user; and
transmitting information on the at least one harmful substance to an external entity.

11. A device for managing cleanliness of an interior of a vehicle, the device comprising:
a contamination detector comprising at least a camera;
a communicator; and
a controller configured to:
detect indoor contamination based on information acquired using the contamination detector,
when information on a next user comprising information on at least one user scheduled to ride in the vehicle is received through the communicator, determine at least one harmful substance based on a result of detection of the indoor contamination and the information on the next user, and
perform control such that information on the at least one harmful substance is transmitted to an external entity through the communicator.

12. The device according to claim 11, wherein the controller compares at least one substance included in the result of detection of the indoor contamination with a predetermined harmful substance list to determine the at least one harmful substance.

13. The device according to claim 11, wherein the information on the next user comprises information used to determine a specific harmful substance for each of the at least one user.

14. The device according to claim 13, wherein the information used to determine the specific harmful substance comprises at least one of age, occupation, gender, allergy-causing substances, or distasteful substances.

15. The device according to claim 13, wherein the controller determines a candidate harmful substance based on the information used to determine the specific harmful substance and compares the candidate harmful substance with at least one substance included in the result of detection of the indoor contamination to determine the at least one harmful substance.

16. The device according to claim 11, wherein the controller determines a degree of influence of each of the determined at least one harmful substance on each of the at least one user.

17. The device according to claim 16, wherein the information on the next user comprises a position at which each of the at least one user is scheduled to be located, and
wherein the controller determines the degree of influence in consideration of the position at which each of the at least one user is scheduled to be located and a position of the at least one harmful substance.

18. The device according to claim 11, wherein the controller performs air-conditioning control in consideration of a position of the determined at least one harmful substance.

19. The device according to claim 11, wherein the controller detects at least one object in an indoor region subjected to contamination detection and detects whether contamination has occurred in the indoor region excluding a region in which each of the at least one object is detected.

20. The device according to claim 14, wherein the controller determines a degree of influence of each of the determined at least one harmful substance on each of the at least one user in consideration of allergy intensity.

* * * * *